United States Patent [19]

Miki et al.

[11] Patent Number: 4,717,315
[45] Date of Patent: Jan. 5, 1988

[54] SMALL SIZE AXIAL-FLOW MOLECULAR PUMP USING A MAGNETIC BEARING

[76] Inventors: Masaharu Miki; Tadao Ishizawa; Chiaki Urano, all of 31-1, Kameido 6-chrome, Koto-ku, Tokyo, Japan

[21] Appl. No.: 694,907

[22] Filed: Jan. 25, 1985

Related U.S. Application Data

[63] Continuation of Ser. No. 413,569, Aug. 31, 1982, abandoned.

[30] Foreign Application Priority Data

Sep. 4, 1981 [JP] Japan ............................... 56-139556

[51] Int. Cl.$^4$ ............................................. F04B 17/00
[52] U.S. Cl. ..................................... 417/365; 417/424
[58] Field of Search ............... 417/424, 352, 353, 365; 415/90; 308/10

[56] References Cited

U.S. PATENT DOCUMENTS

| | | | |
|---|---|---|---|
| 3,890,019 | 6/1975 | Boden et al. | 308/10 |
| 3,954,310 | 5/1976 | Rava | 308/10 |
| 4,023,920 | 5/1977 | Bächler et al. | 417/372 X |
| 4,036,565 | 7/1977 | Becker | 417/424 |
| 4,082,376 | 4/1978 | Wehde et al. | 308/10 |
| 4,116,592 | 9/1978 | Cherny et al. | 415/90 |
| 4,121,143 | 10/1978 | Habermann et al. | 308/10 |

FOREIGN PATENT DOCUMENTS 2741062  3/1979  Fed. Rep. of Germany ........ 308/10

Primary Examiner—Leonard E. Smith
Assistant Examiner—Donald E. Stout
Attorney, Agent, or Firm—Bruce L. Adams

[57] ABSTRACT

An axial-flow molecular pump has a first active magnetic bearing for axially supporting and controlling a pump member comprised of a set of permanent magnets on the upper end of the pump member cooperating with a set of permanent magnets fixedly mounted at the upper end of a pump housing, a first electromagnet coacting with the sets of permanent magnets and operative when energized for controlling the axial position of the pump member, and an axial sensor for detecting axial displacement of the pump member and accordingly controlling the energization of the first electromagnet. A second active magnetic bearing for radially supporting and controlling the pump member comprises a second electromagnet operative when energized for controlling the radial position of the pump member, and a radial sensor for detecting radial displacement of the pump member and accordingly controlling the energization of the second electromagnet. Radial vibrations of the pump member during rotation thereof are rapidly suppressed in a very short decay time period due to the two active magnetic bearings which have rapid response characteristics and are able to effect precise and accurate positioning of the pump member.

14 Claims, 2 Drawing Figures

SMALL SIZE AXIAL-FLOW MOLECULAR PUMP USING A MAGNETIC BEARING

This is a continuation of application Ser. No. 413,569, filed Aug. 31, 1982, now abandoned, which claims priority of Japanese Patent Application No. 139556/81 filed Sept. 14, 1981.

BACKGROUND OF THE INVENTION

An axial-flow molecular pump having a conventional magnetic bearing is shown in FIG. 1. The axial-flow molecular pump utilizes a magnetic bearing and actively controls each of the five degrees of freedom of the rotating pump member. Reference numeral 1 denotes a rotating axis direction displacement sensor, 2 is a rotating axis direction control electromagnet, 3 is an upper radial direction displacement sensor (two directions of xu, yu), 4 is an upper radial direction control electromagnet (two directions of xu, yu), 5 is a lower radial direction displacement sensor (two directions of xd, yd) and 6 is a lower radial direction control electromagnet (two directions of xd, yd).

Such an axial-flow molecular pump has several drawbacks. A major drawback is that many sensors and electromagnets arranged in a complicated manner are required for the control system in order to effect control with five degrees of freedom of the axial-flow molecular pump for which only high speed rotating operation is required. Accordingly, the calorific value increases owing to a large number of magnets and so on. Further, though the reliability is increased because the pump has no mechanical contact part, the reliability is restricted in view of the complexity of the electric circuit.

Figure 1:
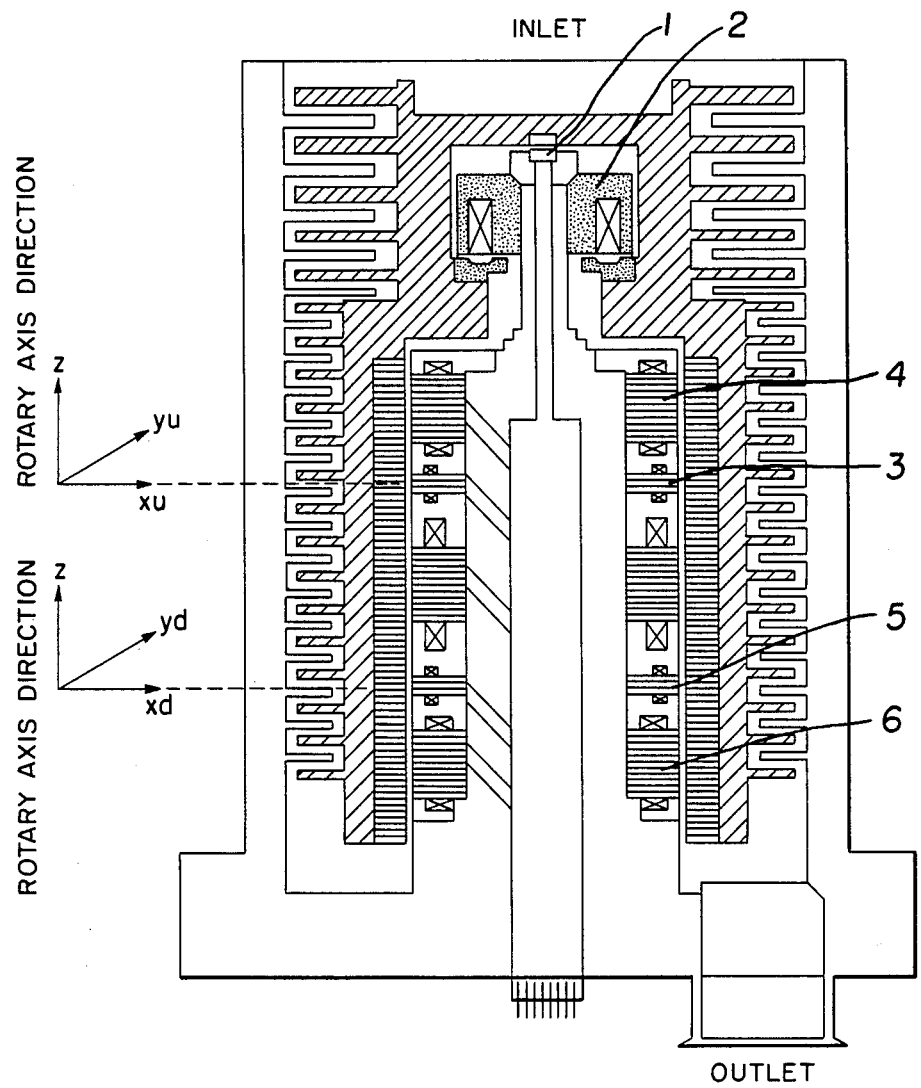
FIG. 1 is a sectional view of a conventional axial flow molecular pump utilizing a magnetic bearing of five axis control system; and, FIG. 2 is a sectional view of an embodiment of an axial flow molecular pump of the present invention which utilizes a magnetic bearing with two passive axes and three active axes. In the drawings, the hatched portions denote rotating portions.
Figure 2:
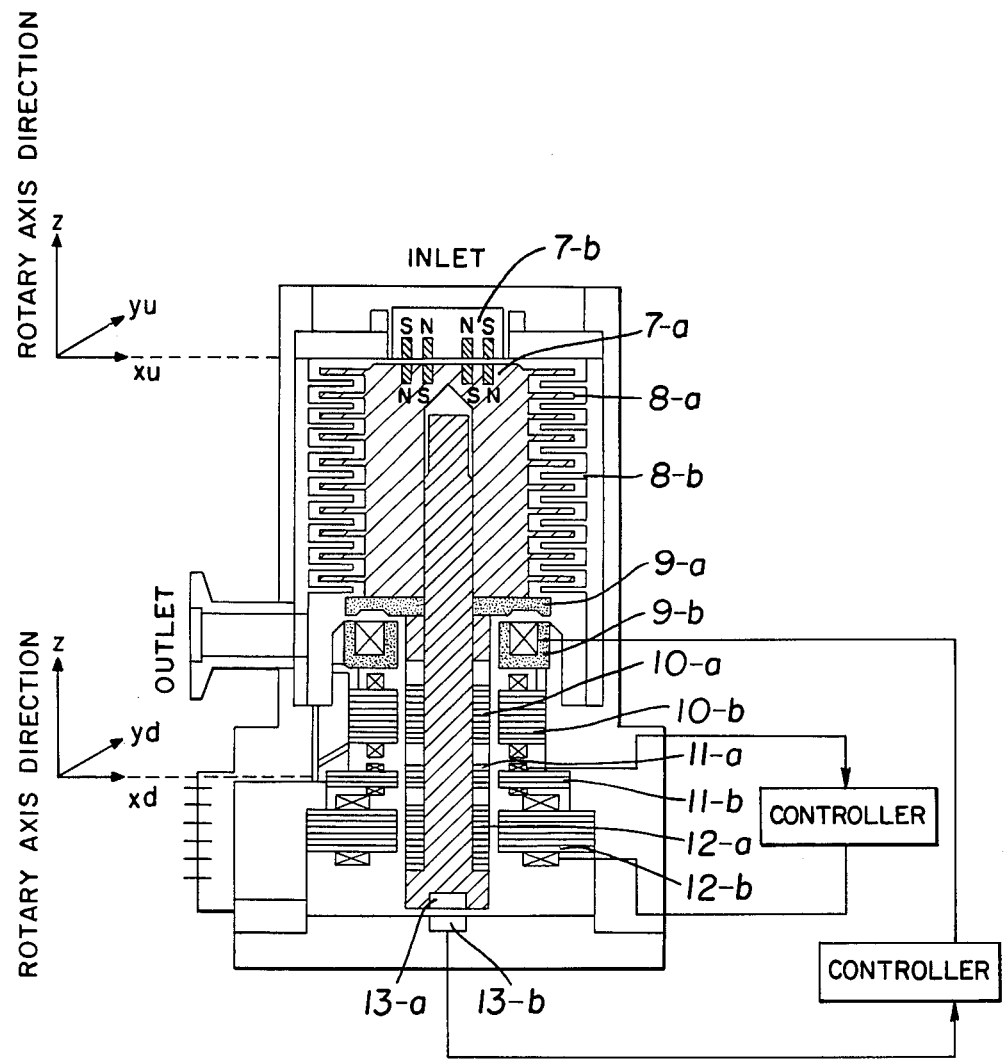

It is an object of the present invention to provide an axial-flow molecular pump which is comparatively simple in structure and which has the advantages of long service life of the bearing, less lubrication oil, low rotating energy loss and the like. An embodiment of the structure is shown in FIG. 2. The pump comprises a housing having an intake opening and a drain opening. 7-a and 7-b are structural members for an upper radial direction passive type magnetic bearing for supporting a rotatable pump member in the upper radial direction (disposed along two orthogonal directions of xu, yu), and permanent magnets incorporated therein are attracted to each other. The attractive power keeps the rotating pump member body at a center (xu, yu) which depends upon the position of the structural member 7-b. The pump member has a generally solid cylindrical upper portion which is connected to a shaft in the manner shown in FIG. 2. A set of rotating blades 8-a to perform the pumping function of the axial-flow molecular pump are connected to the rotatable pump member and coact with a set of fixed blades 8-b. 9-a is an armature disc for a rotating axis direction control electromagnet for controlling a rotating direction and 9-b is a rotating axis direction control electromagnet. The axial position of the rotating pump member body in the rotating axis direction (z direction) is detected by use of a rotating axis direction displacement sensor 13-a, 13-b. The current flowing through the rotating axis direction control electromagnet 9-b is adjusted in accordance with the difference between the detected position and a reference position to increase or decrease the force applied in the direction of the rotating axis, so that the rotating pump member body is maintained at a reference position in the rotating axis direction. 10-a is a high frequency motor rotator and 10-b is a stator thereof. 12-a is one of a pair of diametrically opposed lower radial direction control electromagnet rotators and 12-b is one of a pair of diametrically opposed lower radial direction control electromagnets, (similar pairs of diametrically opposed rotators and electromagnets are disposed orthogonally relative to the first-mentioned pairs in the same plane therewith to jointly define two orthogonal directions of xd and yd corresponding to two radial degrees of freedom of the pump member). By means of a lower radial direction displacement sensor target 11-a and a lower radial direction displacement sensor 11-b (disposed along two orthogonal directions of xd and yd), the radial direction (xd, yd) of the lower portion of the rotating pump member body is detected and the lower portion of the rotating pump member body is maintained at the reference position by controlling the current flowing through the lower radial direction control electromagnet 12-b in accordance with the difference between the detected position and the reference position.

The axial-flow molecular pump arranged as described above makes the rotating pump member actively float in the rotating axis direction (z direction) by means of the parts 7, 9 and 13. The upper radial direction is passively supported by the part 7 without contact and the lower radial direction is actively supported by parts 11 and 12 without contact. Thus, the rotating blades 8-a are rotated at high speed by the high frequency motor 10 to transport the gaseous molecules from the intake opening to the drain opening. The features of such an axial-flow molecular pump are as follows:

First, it can make the best use of the essential advantages of magnetic bearing since it is floating without any contact.

Second, the loss of the rotating energy is small even if it rotates at high speed since the bearing does not contact mechanically.

Third, as lubrication oil is not necessary for this pump, maintenance is not needed.

Fourth, since only three directions are controlled actively, the control system and the structure become less complex, so that it is possible to miniaturize it.

Fifth, the amount of head produced from the device decreases as the number of the electromagnets decreases, so that the system is simplified and the reliability is increased with respect to the electric circuit.

And further, the device is free from adverse effects due to the exhausted gas since the motor and the electromagnet are located on the lower vacuum side.

Since the attenuation is electrically provided not only in the rotating axis direction but also in the radial direction by utilizing the lower radial direction control electromagnet, it is possible to increase the revolutional speed over the resonance point. Consequently, this system is most suitable for an axial-flow molecular pump which rotates at a high speed without contact.

We claim:

1. In an axial flow molecular pump having an upstanding housing having an inlet opening for introducing gaseous molecules during use of the pump and an outlet opening for discharging the gaseous molecules: a set of fixed blades fixedly mounted within the housing and extending radially thereof; a rotatable pump member rotatably disposed within the housing to undergo rotation about a vertical rotary axis and carrying a set of radially-extending blades which coact with the fixed blades to pump the gaseous molecules from the inlet opening to the outlet opening during rotation of the pump member; and supporting means for magnetically rotatably supporting and maintaining the pump member to undergo rotation about the vertical rotary axis, the supporting means comprising first magnetic bearing means for both axially supporting the pump member and actively controlling the axial position of the pump member and comprised of a set of permanent magnets on the upper end of the pump member cooperating with a set of permanent magnets fixedly mounted at the upper end of the housing, first energizeable electromagnetic means axially spaced from the sets of permanent magnets and coacting therewith when energized for axially supporting the pump member and controlling the axial position thereof, and axial detecting means for detecting axial displacement of the pump member and accordingly controlling the energization of the first electromagnetic means, and second magnetic bearing means for both radially supporting the pump member and actively controlling the radial position of the pump member and comprised of second energizeable electromagnetic means disposed axially below the outlet opening and operative when energized for radially supporting the lower portion of the pump member and controlling the radial position thereof, and radial detecting means for detecting radial displacement of the lower portion of the pump member and accordingly controlling the energization of the second electromagnetic means.

2. An axial flow molecular pump according to claim 1; wherein the first electromagnetic means comprises an armature fixed to the pump member, and a stationary electromagnet mounted within the housing and operative when energized to selectively vary the magnetic attractive force between the armature and electromagnet to thereby adjustably control the axial position of the pump member.

3. An axial flow molecular pump according to claim 1; wherein the first electromagnetic means is axially disposed intermediate the second electromagnetic means and the sets of permanent magnets.

4. An axial flow molecular pump according to claim 2; including driving means for rotationally driving the pump member, the driving means being axially disposed below the outlet opening.

5. An axial flow molecular pump according to claim 1; wherein the pump member comprises a generally solid cylindrical upper portion and an axially extending shaft connected to the solid cylindrical upper portion, the pump member blades extending radially outwardly of the solid cylindrical upper portion.

6. An axial flow molecular pump according to claim 5; wherein the solid cylindrical upper portion of the pump member has an axial extent approximately one half that of the total axial extent of the pump member.

7. An axial flow molecular pump according to claim 5; wherein the solid cylindrical upper portion of the pump member is free of any electromagnetic means.

8. An axial flow molecular pump according to claim 1; wherein the second electromagnetic means includes means for radially supporting the pump member at locations which are angularly spaced by 90° about the vertical rotary axis.

9. An axial flow molecular pump according to claim 1; wherein the second magnetic bearing means further includes means for magnetically radially supporting the upper portion of the pump member.

10. An axial flow molecular pump according to claim 9; wherein the means for magnetically radially supporting the upper portion of the pump member comprises means for passively radially supporting the upper portion of the pump member.

11. An axial flow molecular pump according to claim 10; wherein the means for passively radially supporting the upper portion of the pump member comprises the aforesaid sets of permanent magnets which comprise part of the first magnetic bearing means.

12. In an axial flow molecular pump having an upstanding housing having an inlet opening for introducing gaseous molecules during use of the pump and an outlet opening for discharging the gaseous molecules: a set of fixed blades fixedly mounted within the housing and extending radially thereof; a rotatable pump member rotatably disposed within the housing to undergo rotation about a vertical rotary axis and carrying a set of radially-extending blades which coact with the fixed blades to pump the gaseous molecules from the inlet opening to the outlet opening during rotation of the pump member; and supporting means for magnetically rotatably supporting and maintaining the pump member to undergo rotation about the vertical rotary axis, the supporting means comprising first magnetic bearing means for both axially supporting the pump member and actively controlling the axial position of the pump member and comprised of a set of permanent magnets on the upper end of the pump member cooperating with a set of permanent magnets fixedly mounted at the upper end of the housing, first energizeable electromagnetic means axially spaced from the sets of permanent magnets and coacting therewith when energized for axially supporting the pump member and controlling the axial position thereof, and axial detecting means for detecting axial displacement of the pump member and accordingly controlling the energization of the first electromagnetic means, and second magnetic bearing means for both radially supporting the pump member and actively controlling the radial position of the pump member and comprised of second energizeable electromagnetic means operative when energized for radially supporting the lower portion of the pump member and controlling the radial position thereof, and radial detecting means for detecting radial displacement of the lower portion of the pump member and accordingly controlling the energization of the second electromagnetic means, the second electromagnetic means comprising a first pair of electromagnets disposed along a first axis in diametrically opposed relation relative to the pump member for actively controlling one degree of freedom of radial motion of the pump member along the first axis, and a second pair of electromagnets disposed along a second axis orthogonal to the first axis in diametrically opposed relation relative to the pump member for actively controlling one degree of freedom of radial motion of the pump member along the second axis.

13. An axial flow molecular pump according to claim 12; wherein the first and second axes lie in the same plane.

14. An axial flow molecular pump according to claim 12; wherein the radial detecting means comprises two pairs of sensors disposed on orthogonal axes for detecting radial displacement of the pump member along the first and second axes.

* * * * *